United States Patent [19]
Ashihara et al.

[11] Patent Number: 4,927,719
[45] Date of Patent: May 22, 1990

[54] DRY CELL

[75] Inventors: Ryohei Ashihara, Neyagawa; Kikumitsu Suehiro, Kadoma; Kazuo Sugino; Jun Miyoshi, both of Hirakata, all of Japan

[73] Assignee: Matsushita Electric Industrial Co., Ltd., Osaka, Japan

[21] Appl. No.: 291,788

[22] Filed: Dec. 29, 1988

[30] Foreign Application Priority Data

Dec. 29, 1987 [JP] Japan ............................ 62-334456

[51] Int. Cl.⁵ .............................................. H01M 2/12
[52] U.S. Cl. ........................................ 429/54; 429/55; 429/82
[58] Field of Search ............................ 429/54, 55, 82

[56] References Cited

U.S. PATENT DOCUMENTS

| | | |
|---|---|---|
| 2,934,584 | 4/1960 | Warren et al. . |
| 3,285,784 | 11/1966 | Babusci et al. . |
| 3,442,716 | 5/1969 | Muraki et al. . |
| 3,503,811 | 3/1970 | Urry ............................ 429/54 |
| 3,970,478 | 7/1976 | Jurva ........................... 429/82 |
| 4,227,701 | 10/1980 | Tsuchida et al. . |
| 4,271,241 | 6/1981 | Hooke et al. ................ 429/54 |

FOREIGN PATENT DOCUMENTS 2424428 12/1975 Fed. Rep. of Germany .
1014355 6/1963 United Kingdom .

OTHER PUBLICATIONS

Patent Abstracts of Japan, vol. 11, No. 351 (E-557) [2798] Nov. 17, 1987 (JP-A-62-128434, 6-10-87).

*Primary Examiner*—Stephen J. Kalafut
*Attorney, Agent, or Firm*—Wenderoth, Lind & Ponack

[57] ABSTRACT

A dry cell which is so arranged that, with a bottom plate being disposed at the lower portion of a raw cell sealed at its opening by a sealing member, an insulative seal packing is applied onto the peripheral portion of the bottom plate, while the raw cell and the peripheral portion of the bottom plate are surrounded by a metal jacket welded by laser at its butted opposite ends. At the peripheral portion of the bottom plate, a gas discharge mechanism is formed which is arranged to be normally closed by the seal packing, and to be released from the closing by the seal packing due to deformation of the bottom plate upon increase of internal pressure of the dry cell for discharging the gas within the dry cell outside, and thus, a safe dry cell free from a danger of rupture maybe provided.

5 Claims, 4 Drawing Sheets

Double-lock type

Laser-welded type

Laser-welded type

Butted-joint type

DRY CELL

BACKGROUND OF THE INVENTION

The present invention generally relates to a dry cell or dry battery, and more particularly, to a cylindrical type Leclanche cell (referred to merely as a dry cell hereinafter) which is free from the danger of rupturing due to an increase of an internal pressure thereof through improvements of its bottom plate for higher safety.

It has been a recent trend that the dry cell has been changed from a paper tube cladding or paper tube jacket type to a metal cladding or metal jacket type, with a marked development on its cell performance through improvements on resistance against leakage and also resistance against expansion or swelling thereof. For the metal jacket type as referred to above, there have generally been employed a double-lock type jacket folded into double layers at its opposite edges, a butted-joint type jacket merely butted to each other at opposite edges thereof, and a laser-welded type jacket subjected to laser welding at its opposite butted edges (referred to as a laser-welded type jacket hereinafter), etc.

Subsequently, construction of an outstanding dry cell B conventionally employed and adopting the metal jacket as referred to above will be described with reference to FIGS. 1 to 3.

As shown in FIG. 1, the dry cell B generally includes a zinc can z containing therein a cathode mixture m, a carbon rod c, a partitioning paper p having a paste layer over its one face, etc., a synthetic resin sealing member 2 for sealing an opening 1 of the zinc can z, a heat-shrinkable synthetic resin tube 6 covering the entire outer periphery of the zinc can z including a bottom plate 4 (anode) at the bottom portion 3 of the zinc can z, a seal packing 5 and a shoulder portion of the sealing member 2, a sealing material 7 such as pitch or the like disposed on a recess formed on the upper surface of the sealing member 2, and a sealing plate 8a integrally formed with a cap 8 (cathode) and disposed on said sealing member 2. The entire dry cell is further clamped, through a resinous packing 9 disposed on the sealing plate 8 and the seal packing 5 provided at the lower portion of the dry cell, by a metallic outer cladding can or metal jacket 10 (referred to as a metal jacket hereinafter) to maintain the dry cell in an air-tight state.

When the laser-welded type metal jacket as shown in FIG. 2(B) is employed as a metal jacket instead of the double-lock type metal jacket (FIG. 2(A)) or butted-joint type metal jacket (FIG. 3(B)), as compared, for example, with the double-lock type metal jacket in FIG. 2(A), since the laser-welded portion 22 has thickness smaller than that of the double-lock portion 21 by a difference a, the laser-welded type metal jacket of FIG. 2(B) can employ a raw cell 23' having a larger external diameter than the raw cell 23 of the double-lock type metal jacket of FIG. 2(A), with a consequent increase of the cell capacity by that extent. Moreover, since the laser-welded metal jacket (FIG. 3(A)) has a tensile strength higher than that of the butted-joint type metal jacket (FIG. 3(B)) in a diametrical direction of the jacket especially at the laser-welded portion 22, said laser-welded metal jacket is free from any separation or opening w at a butted-joint portion 31 as in the butted-joint type metal joint (FIG. 3(B)) even during over-discharging.

In the case where a dry cell employing the laser-welded type metal jacket (FIG. 2(B)) is wrongly used, for example, by undesirable charging thereof or by leaving it in a high temperature atmosphere above 85° C., etc., the dry cell may be expanded due to an increase of its internal pressure through generation of a gas therein. The gas thus generated passes through a gap between the zinc can z and the resinous sealing member 2 so as to be collected between the zinc can z and the synthetic resin tube 6, while part of the gas is discharged outside via the seal packing 5 provided at the bottom portion of the zinc can z (FIG. 1). If the internal pressure within the dry cell is rapidly raised, since the tensile strength in the diametrical direction is extremely high in the case of the laser-welded type metal jacket (FIG. 2(B), FIG. 3(A)) as compared with that of the double-lock type metal jacket (FIG. 2(A)) or butted-joint type metal joint (FIG. 3(B)), the dry cell is expanded longitudinally in the direction of its height, thus resulting in such troubles as disengagement of the cap 8 integrally formed with the sealing plate 8a and provided at the upper portion or scattering of the cathode mixture m. Particularly, in the case of scattering of the cathode mixture m, appliances employing the dry cell may be heavily damaged, giving rise to various accidents in some cases.

SUMMARY OF THE INVENTION

Accordingly, an essential object of the present invention is to provide a dry cell which is provided with a gas discharging mechanism through improvement of a bottom plate employed therein, with substantial elimination of disadvantages inherent in the conventional dry cells of this kind.

Another object of the present invention is to provide a dry cell of the above described type which is simple in construction, and stable in function, and can be readily manufactured on a large scale at low cost.

In accomplishing these and other objects, according to one preferred embodiment of the present invention, there is provided a dry cell which includes a raw cell sealed at its opening by a sealing material, a bottom plate provided at the lower portion of the raw cell, a cap provided at the upper portion of said raw cell, a metal jacket covering the outer periphery of said raw cell and subjected to laser welding at its opposite butted ends, and a seal packing interposed between the lower edge of said metal jacket and a peripheral edge of said bottom plate, and is characterized in that there is provided a gas discharge mechanism provided at said peripheral edge of said bottom plate, and arranged to be normally closed by said seal packing and to be released from the closing upon deformation by an increase of an internal pressure of the dry cell for discharging gas within said dry cell therethrough.

It should be noted here that according to the present invention, a laser-welded type metal jacket is particularly employed, and the gas discharging mechanism is provided at the peripheral portion of the bottom plate normally closed by the seal packing. Even when the gas discharging mechanism is provided at the peripheral portion of the bottom plate, if the dry cell is wrongly used by undesirable electrical charging, etc., the pressure inside the dry cell is raised to expand the cell. In the case where the laser-welded type metal jacket is employed, the dry cell is hardly expanded in its diametrical direction by the strength of the metal jacket, and the bottom plate 4 and the sealing plate 8a integrally formed with the cap 8 which are located at the lower and upper portions of the raw cell start to be deformed. However, by the provision of the gas discharging mechanism at the peripheral portion of the bottom plate 4, following the above deformation resulting from rising of the cell internal pressure, the air-tightness among the bottom plate 4, seal packing 5 and the lower portion of the metal jacket 10 is lost, and consequently, the gas staying within the cell or between the zinc can z and the synthetic resin tube 6 rapidly escapes outside, whereby the undesirable disengagement of the sealing plate 8a integral with the cap 8, and also scattering of the cathode mixture m may be advantageously prevented.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
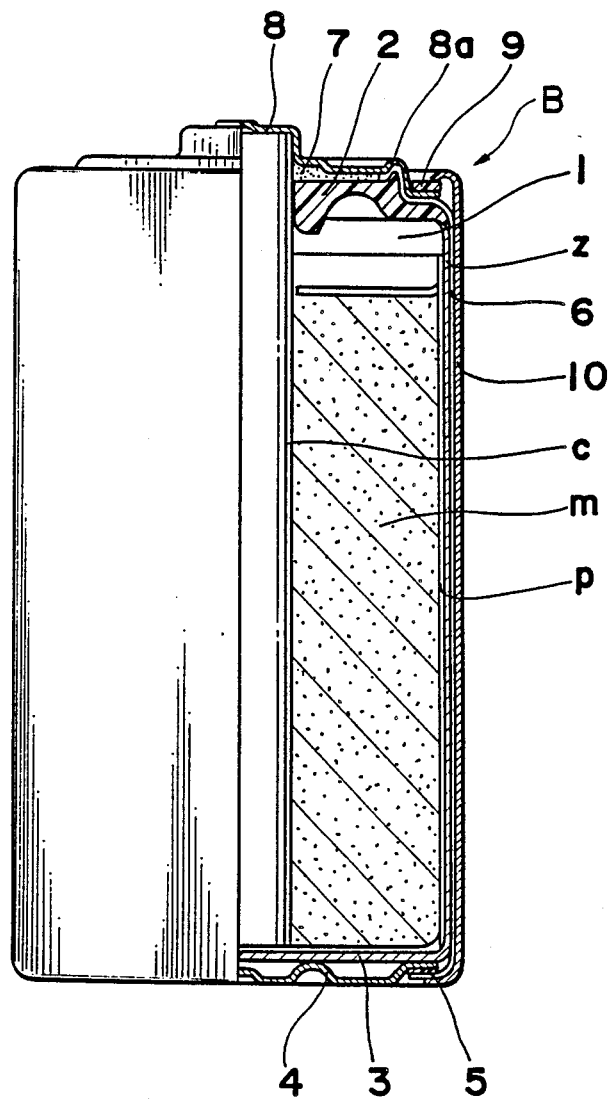
FIG. 1 is a side elevational view, partly in section, showing construction of a typical dry cell conventionally employed (already referred to)

Before the description of the present invention proceeds, it is to be noted that like parts are designated by like reference numerals throughout the accompanying drawings.

In the first place, it is to be noted that in FIGS. 5, 6, 8 and 9, only the lower portions of dry cells including gas discharging mechanism directly related to the present invention are shown for brevity, since the upper portions of the dry cells have construction generally similar to that in the conventional dry cell of FIG. 1, with like parts being designated by like reference numerals.

Figure 2A:
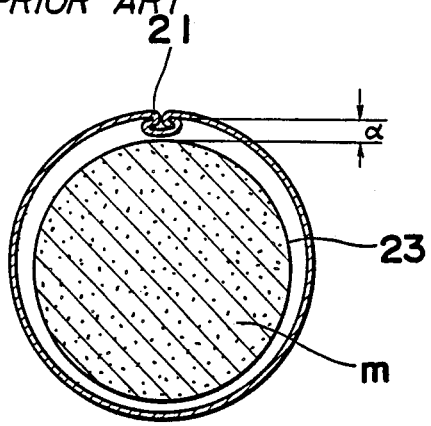
FIGS. 2(A) and 2(B) are schematic side sectional views of a dry cell employing double-lock type metal jacket and a dry cell employing a laser-welded type metal jacket for explaining a difference in the external diameter of raw cells contained therein (already referred to)
Figure 2B:
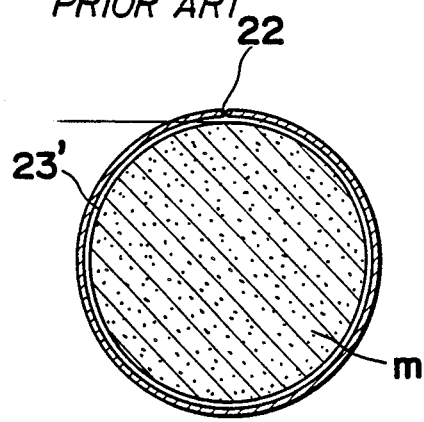
Figure 3A:
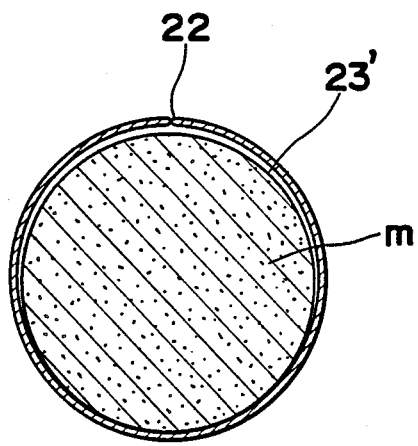
FIGS. 3(A) and 3(B) are also schematic side sectional views of a dry cell employing the laser-welded type metal jacket an a dry cell employing a butted-joint type metal jacket for explaining behaviors thereof during over-discharging of the cells (already referred to)
Figure 3B:
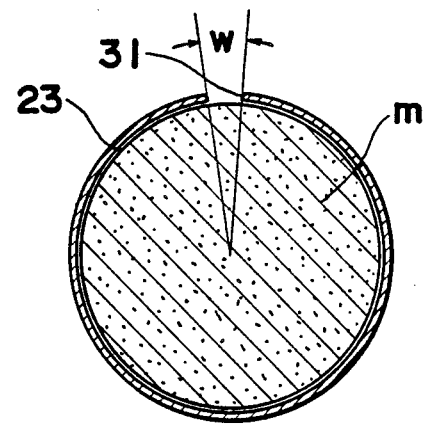
Figure 5:
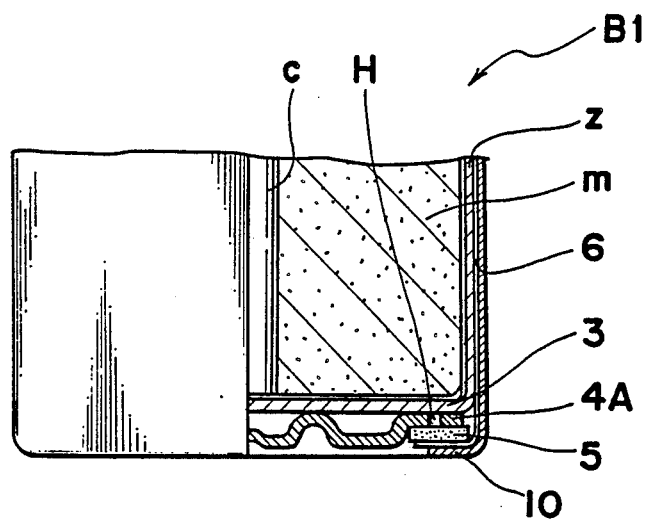
FIG. 5 is a fragmentary side elevational view, partly in section and showing the lower portion of a dry cell employing the bottom plate of FIG. 4 according to on preferred embodiment of the present invention.

Referring now to the drawings, there is shown in FIG. 5, a dry cell B1 according to one preferred embodiment of the present invention which includes a raw cell sealed at its opening 1 (FIG. 1) by a sealing material 2(FIG. 1), a bottom plate 4A provided at the lower portion of the raw cell, a cap 8(FIG. 1) provided at the upper portion of the raw cell, a metal jacket 10 covering the outer periphery of the raw cell and subjected to laser welding at its opposite butted ends 22 (FIG. 2(B)), and a seal packing 5 interposed between the lower edge of the metal jacket 10 and a peripheral edge of the bottom plate 4A, and characterized in that there is provided a gas discharge mechanism provided at the peripheral edge of the bottom plate 4A, and arranged to be normally closed by the seal packing 5 and to be released from the closing upon deformation by an increase of an internal pressure of the dry cell for discharging gas within the dry cell therethrough.

Figure 4:
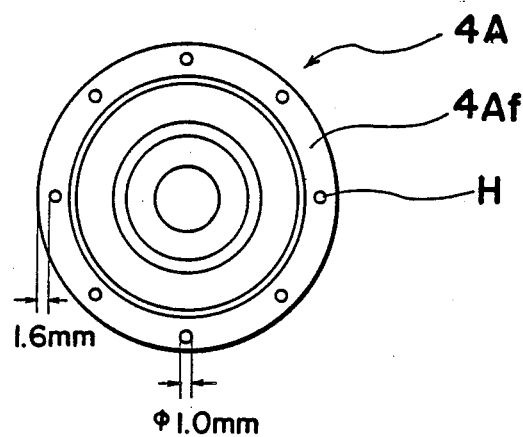
FIG. 4 is a top plan view of a bottom plate having gas discharging holes in its peripheral portion and employed in a dry cell (FIGS. 5 and 6) according to one preferred embodiment of the present invention.

As shown in FIG. 4 the bottom plate 4A is provided with a plurality of gas discharge holes H formed in a peripheral edge 4Af of the bottom plate 4A. More specifically, the gas discharge openings H each having a diameter of 1 mm are formed in plurality in positions spaced inwardly from the outer face of the peripheral edge by 1.6 mm, at equal intervals as illustrated so as to be closed from below by the seal packing 5. The configuration of the holes H can be modified, for example, to elongated shape besides circular shape, and the size of the holes H may also be selected as desired.

As is seen from FIG. 5, the gas discharge openings H are provided in the peripheral edge 4Af of the bottom plate 4A in such positions and size as will be overlapped by the seal packing 5 at the lower side thereof, and the bottom plate 4A is clamped by folding the lower edge of the metal jacket 10 inwardly as in the conventional practice. In this case, it is preferable that the lower end of the metal jacket 10 folded inwardly is also so positioned as to overlap the gas discharge holes H, and this is advantageous in positively closing the gas discharge holes H during normal use, thereby to maintain the resistance against leakage by keeping sufficient liquid tightness and air tightness.

By the above construction, connecting terminals (not shown) at the load side are normally connected to the terminal portions of the dry cell B1 by correct polarities, and the dry cell is thus protected against undesirable charging, etc. However, by some causes, if the dry cell is subjected to wrong use such as charging or the like, with the cell being expanded as a gas is generated therein, the bottom plate 4A swells outwardly to be deformed as at D in FIG. 6, and between the bottom plate 4A and the seal packing 5, there is formed a small gap, through which the gas within the dry cell B1 escapes outside via a passage as indicated by arrows.

Figure 6:
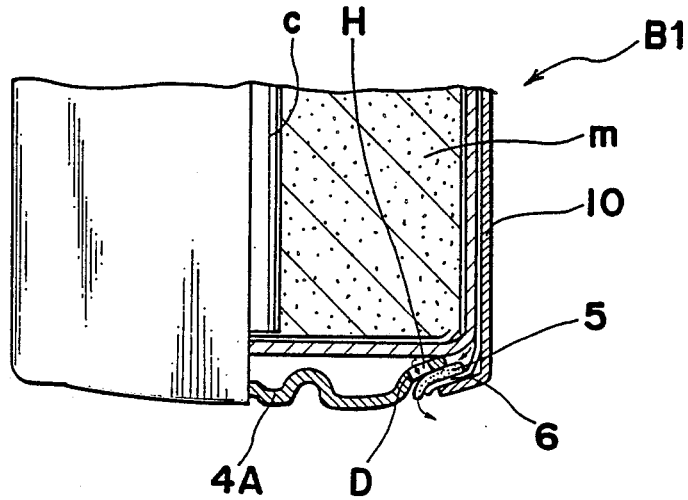
FIG. 6 is a view similar to FIG. 5, which particularly shows the state of deformation of the bottom plate following gas generation upon undesirable charging of the dry cell.
Figure 7:
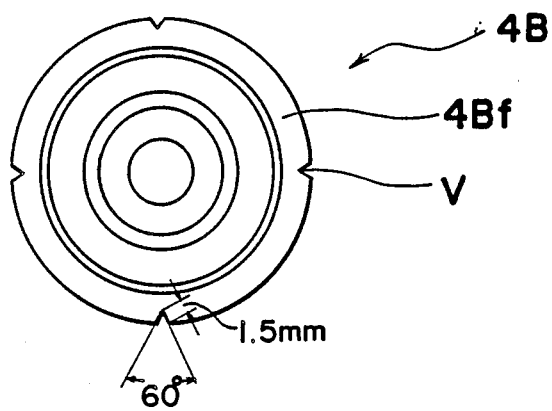
FIG. 7 is a top plan view of a bottom plate having gas discharging notches in its peripheral portion and employed in a dry cell (FIGS. 8 and 9) according to a modification of the present invention.

Referring further to FIG. 7, there is shown a modification of the bottom plate 4A described so far with reference to FIGS. 4 to 6.

In the modified bottom plate 4B in FIG. 7, the gas discharge holes H described as formed in the peripheral edge 4Af of the bottom plate 4A are replaced by four gas discharge notches V formed at the outer face of a peripheral edge 4Bf of the bottom plate 4B at equal intervals. Each of the notches V in a V-shape has two sides forming an angle of 60° therebetween and each measuring 1.5 mm in length as shown. These notches V may be formed, e.g. into a U-shape besides the V-shape as described above, and the size thereof may also be altered as desired.

Figure 8:
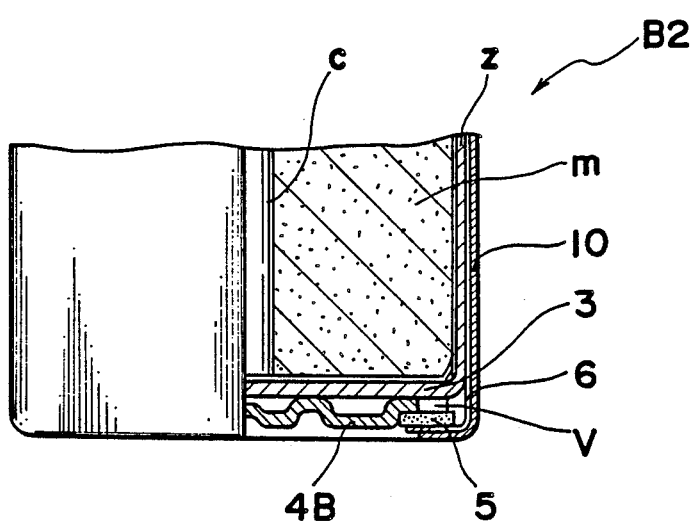
FIG. 8 is a fragmentary side elevational view, partly in section and showing the lower portion of a dry cell employing the bottom plate of FIG. 7 according to the modification of the present invention.

FIG. 8 shows a dry cell B2 in which the bottom plate 4A in the dry cell B1 of FIGS. 4 to 6 is replaced by the modified bottom plate 4B in FIG. 7.

In the above arrangement of FIG. 8 also, the positional relation among the notches V of the bottom plate 4B, the seal packing 5 and the metal jacket 10 should preferably be similar to that in the bottom plate 4A having the gas discharge holes H in FIGS. 4 to 6.

Figure 9:
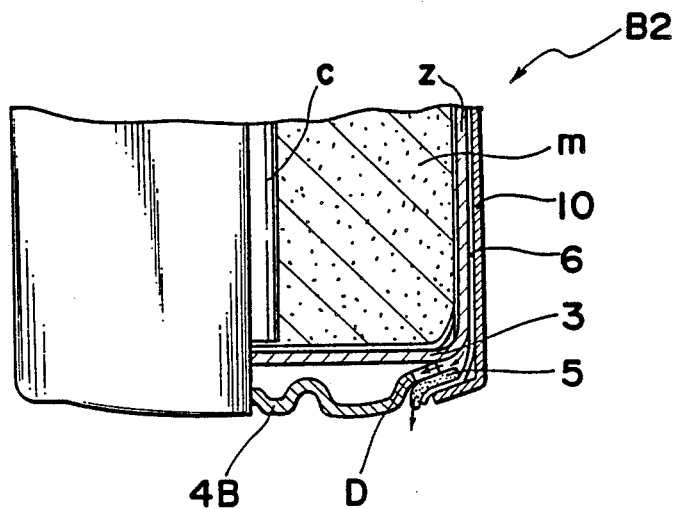
FIG. 9 is a view similar to FIG. 8, which particularly shows the state of deformation of the bottom plate following gas generation upon undesirable charging of the dry cell.

In this case also, upon expansion of the dry cell due to generation of gas by the wrong use such as undesirable charging of the cell, etc., the bottom plate 4B is deformed as at D and the gas escapes outside through a passage indicated by arrows in FIG. 9. Since the degree of deformation of the bottom plate 4B having the gas discharge notches V becomes larger than that of the bottom plate 4A having the gas discharge holes H as the pressure applied thereto is increased, there were some cases where part of the bottom plate 4B was disengaged from the metal jacket 10.

Table 1 below shows comparison of scattering of the cathode mix due to rupture of dry cells having or not having the gas discharge mechanism in the bottom plates.

Each of dry cells used for the experiments in Table 1 was prepared in a normal process by filling in a zinc can, a cathode mix prepared by mixing 20 parts by weight of acetylene black, 83 parts by weight of electrolyte mainly composed of zinc chloride, and 1 part by weight of zinc chloride, with respect to 100 parts by weight of manganese dioxide, through a separating paper having a paste layer on its one surface.

TABLE 1

| kinds of bottom plate | | | | |
|---|---|---|---|---|
| charge current | charge time | Without gas discharge mech. | With gas discharge holes | With gas discharge notches |
| 500 mA | 24 hr | 4/10 | 0/10 | 0/10 |
| 30 mA | 240 hr | 1/10 | 0/10 | 0/10 |

As is seen in the above Table 1, in the dry cells provided with the gas discharge mechanism according to the present invention, even when the internal pressure of the dry cells is raised by wrong use such as short-time charging by a large current or long-time charging by a small current, the gas is discharged outside through the gas discharge mechanism without giving rise to rupture of the cell even if the swelling in the longitudinal direction of the dry cell takes place, and therefore, no external scattering of the cathode mix was noticed.

As is clear from the foregoing description, according to the dry cell of the present invention, the laser-welded type metal jacket is employed, with the gas discharging mechanism being provided at the peripheral edge of the bottom plate, and therefore, even when the dry cell expands due to gas generation during wrong use of the dry cell such as undesirable charging, etc., so as to be deformed at its bottom plate, the gas rapidly escapes outside through the gas discharge mechanism provided in the bottom plate, and thus, scattering of the cathode mix can be advantageously prevented.

Although the present invention has been fully described by way of example with reference to the accompanying drawings, it is to be note here that various changes and modifications will be apparent to those skilled in the art. Therefore, unless otherwise such changes and modifications depart from the scope of the present invention, they should be construed as included therein.

What is claimed is:

1. In a dry cell which comprises a raw cell having an opening proximate to the upper portion of said raw cell, said opening sealed by a sealing material, a bottom plate provided at the lower portion of said raw cell, a cap provided at the upper portion of said raw cell, a metal jacket conveying the outer periphery of said raw cell and subjected to laser-welding at its opposite butted ends, and a seal packing interposed between the lower edge of said metal jacket and a peripheral edge of said bottom plate, the improvement comprising a gas discharge mechanism provided at said peripheral edge of said bottom plate, and arranged to be normally closed by said seal packing and to be opened upon deformation by an increase of an internal pressure of the dry cell for discharging gas within the dry cell therethrough.

2. The dry cell as claimed in claim 1, wherein said gas discharging mechanism includes more than one opening means in said peripheral edge of said bottom plate covered by said seal packing.

3. The dry cell as claimed in claim 1, wherein said gas discharging mechanism includes more than one notch means in said peripheral edge of said bottom plate covered by said seal packing.

4. The dry cell as claimed in claim 2, wherein said opening means includes a plurality of circular holes or elongated holes formed in said peripheral edge at equal intervals.

5. The dry cell as claimed in claim 3, wherein said notch means includes a plurality of V-shaped or U-shaped removed portions formed in said peripheral edge at equal intervals.

* * * * *